(12) United States Patent
Alakuijala et al.

(10) Patent No.: US 10,491,377 B2
(45) Date of Patent: Nov. 26, 2019

(54) HASHING USING DATA PARALLEL INSTRUCTIONS

(71) Applicant: GOOGLE INC., Mountain View, CA (US)

(72) Inventors: Jyrki Antero Alakuijala, Wollerau (CH); Jan Wassenberg, Langnau am Albis (CH)

(73) Assignee: GOOGLE LLC, Mountain View, CA (US)

( * ) Notice: Subject to any disclaimer, the term of this patent is extended or adjusted under 35 U.S.C. 154(b) by 304 days.

(21) Appl. No.: 15/444,663

(22) Filed: Feb. 28, 2017

(65) Prior Publication Data

US 2018/0248686 A1 Aug. 30, 2018

(51) Int. Cl.
*H04L 9/06* (2006.01)
*G06F 7/58* (2006.01)

(52) U.S. Cl.
CPC ............ *H04L 9/0643* (2013.01); *G06F 7/582* (2013.01)

(58) Field of Classification Search
CPC .............................. H04L 9/0643; G06F 7/582
See application file for complete search history.

(56) References Cited

U.S. PATENT DOCUMENTS

| | | | | |
|---|---|---|---|---|
| 2003/0212727 A1* | 11/2003 | Macy | ...................... | G06F 7/722 708/620 |
| 2004/0086117 A1* | 5/2004 | Petersen | ................. | H04L 9/001 380/44 |
| 2008/0243977 A1* | 10/2008 | Watanabe | ............... | G06F 7/582 708/250 |
| 2009/0141887 A1* | 6/2009 | Yap | ....................... | H04L 9/0643 380/28 |
| 2009/0310775 A1* | 12/2009 | Gueron | ................. | H04L 9/0637 380/28 |
| 2010/0306294 A1* | 12/2010 | Schneider | ............. | H04L 9/0643 708/250 |
| 2012/0201373 A1* | 8/2012 | Hua | ....................... | H03K 19/21 380/28 |

(Continued)

OTHER PUBLICATIONS

Wassenberg, et al. "GitHub—googlehughwayhash: Fast strong has functions: SipHash/HighwayHash", GitHub.com (https://github.com/google/highwayhash), printed Feb. 6, 2017, 6 pages.

(Continued)

*Primary Examiner* — J. Brant Murphy
(74) *Attorney, Agent, or Firm* — Brake Hughes Bellermann LLP

(57) ABSTRACT

Systems and methods generate reasonably secure hash values at relatively few CPU cycles per byte. An example method includes, for each of a plurality of packets, injecting the packet into an internal state that represents an internal hash sum, mixing the internal state using multiplication, and shuffling the result of the multiplication so that bytes with highest quality are moved to locations that will propagate most widely in a next multiplication operation. Each of the plurality of packets include data from an input to be hashed. In some implementation, a last packet for the input is padded. The method may also include further mixing the internal state using multiplication after processing the plurality of packets and providing, to a requesting process, a portion of the final internal state as a hash of the input.

20 Claims, 10 Drawing Sheets

(56) References Cited

U.S. PATENT DOCUMENTS

| | | | |
|---|---|---|---|
| 2014/0189368 A1* | 7/2014 | Wolrich | G06F 21/64 |
| | | | 713/190 |
| 2015/0120754 A1* | 4/2015 | Chase | G06F 16/2255 |
| | | | 707/747 |
| 2015/0215114 A1* | 7/2015 | Alahmad | H04L 9/0643 |
| | | | 380/44 |
| 2017/0102922 A1* | 4/2017 | Steele, Jr. | G06F 7/586 |
| 2018/0248687 A1 | 8/2018 | Wassenberg et al. | |

OTHER PUBLICATIONS

Alakuijala, et al., Fast keyed hash/pseudo-random function using SIMD multiply and permute:, retrieved from https://arxiv.org/abs/1612.06257v2, Dec. 28, 2016, 15 pages.

* cited by examiner

```
                                                          400
      void Update (const vector_class& packet) {
                ┌  v1 += packet;
                │  v1 += mul0;
       405      └

┌  mul0 ^= vector_class(_mm256_mul_epu32(v1, v0 >> 32));
                │  v0 += mul1;
       410      └  mul1 ^= vector_class(_mm256_mul_epu32(v0, v1 >> 32));

┌  v0 += ZipperMerge(v1);
                │  v1 += ZipperMerge(v0);
       415      └
           }
```

FIG. 4

HASHING USING DATA PARALLEL INSTRUCTIONS

BACKGROUND

Hash functions are mathematical operations run on arbitrary data. By comparing the output hash value from execution of the hash function to a known and expected hash value, the integrity of the input data can be determined. For example, computing the hash of a downloaded file and comparing the result to a previously published hash result for that file can show whether the download has been modified or tampered with. Hash functions are conventionally classified as non-cryptographic and cryptographic, which represents a strength/speed tradeoff. Non-cryptographic hash functions run faster than cryptographic hash functions, but are not as secure, making them most useful in time-sensitive tasks or in tasks where security need not be as strong, e.g., generating random numbers, bloom filters, and message authentication for short-lived messages. Cryptographic hash functions are much more secure, but run too slowly for large-scale or time-sensitive use. A key aspect of secure hash functions is their collision resistance: two different input values should not result in the same hash output. More secure hash functions are more collision resistant due to mixing of the input, which makes it difficult to find a pre-image, i.e., input that hashes to a given output. But mixing increases processing time. Thus, in hash functions, there is a trade-off between security and processing time.

SUMMARY

Implementations provide for a fast pseudo-random hash function, referred to as a HighwayHash, that is more secure than other non-cryptographic hash functions. The HighwayHash takes advantage of multiplication operations in a parallel processing environment, using the multiplication operations and shuffling for mixing. Disclosed implementations generate hash values nearly as fast as non-cryptographic hash functions that are considered vulnerable to attacks (e.g., Murmur3 and CityHash), but the hash values generated are much less vulnerable to attacks. Thus, disclosed implementations offer fast but reasonably secure hash values, making them useful for a variety of time-sensitive processes where security is also desired.

According to certain aspects of the disclosure, a computer system includes at least one processor and memory storing instructions that, when executed by the at least one processor, causes the computer system to perform operations. The operations include reading an input file into an input buffer, blocking the input buffer into packets, and for each of the packets, updating an internal state using the packet. Updating the internal state using the packet can include injecting the packet into the internal state, mixing the internal state using multiplication, and shuffling a result of the multiplication so that bits with highest quality are permuted to locations that will propagate most widely in a next multiplication operation. The operations may also include updating the internal state with a packet-sized portion of the internal state, finalizing the state, and storing a portion of the final internal state as a hash of the input file. Updating the internal state with a packet-sized portion of the internal state may include injecting the packet-sized portion into the internal state, mixing the internal state using multiplication, and shuffling the result of the multiplication so that bytes with highest quality are permuted to locations that will propagate most widely in a next multiplication operation.

According to certain aspects of the disclosure, a method includes, for each of a plurality of packets, each packet including data from an input to be hashed, injecting the packet into an internal state that represents an internal hash sum, mixing the internal state using multiplication, and shuffling the result of the multiplication so that bytes with highest quality are moved to locations that will propagate most widely in a next multiplication operation. The method may also include further mixing the internal state using multiplication after processing the plurality of packets and providing, to a requesting process, a portion of the final internal state as a hash of the input.

According to certain aspects of the disclosure, a non-transitory computer-readable medium has code segments stored thereon, the code segments, when executed by a processor cause the processor to perform operations. The operations include, for each of a plurality of packets, each packet including data from an input to be hashed, injecting the packet into an internal state that represents an internal hash sum, mixing the internal state using multiplication, and shuffling the result of the multiplication so that bytes with highest quality are moved to locations that will propagate most widely in a next multiplication operation. The operations also include further mixing the internal state using multiplication after processing the plurality of packets and providing, to a requesting process, a portion of the final internal state as a hash of the input.

In one general aspect, a computer program product embodied on a non-transitory computer-readable storage device includes instructions that, when executed by at least one processor formed in a substrate, cause a computing device to perform any of the disclosed methods, operations, or processes. Another general aspect includes a system and/or a method for generating a hash value using multiplication and shuffling, substantially as shown in and/or described in connection with at least one of the figures, and as set forth more completely in the claims.

One or more of the implementations of the subject matter described herein can be implemented so as to realize one or more of the following advantages. For example, implementations compute a hash value almost four times faster on inputs of 1 KB (kilobytes) than other pseudo-random hash functions, such as SipHash. Even on small inputs, e.g., 8 bytes, disclosed implementations run slightly faster than SipHash. While implementations run as fast as less secure non-cryptographic hash functions, disclosed implementations are similarly unpredictable as SipHash, and apparently as secure. Thus, the hash values are safer than non-cryptographic hash values. Thus, for example, implementations can be used in large-scale uses, such as file checksum, message authentication, hash tables, or generating random numbers, while providing better security than current non-cryptographic hash functions. Accordingly, disclosed implementations can save enormous amounts of CPU (central processing unit) time in data centers. As another example, systems and methods can generate a 64 to 256-bit hash without extra processing cycles. As another example, because implementations are more secure than non-cryptographic hashes, attackers are less likely to find malicious inputs that cause longer hash table lookups or unexpectedly skewed distributions of hashes.

The details of one or more implementations are set forth in the accompanying drawings and the description below. Other features will be apparent from the description and drawings, and from the claims.

BRIEF DESCRIPTION OF DRAWINGS

FIG. 4 is a pseudo-code example of process for updating the internal state of the hash using multiplication and shuffling, in accordance with disclosed implementations.

Like reference symbols in the various drawings indicate like elements.

DETAILED DESCRIPTION

Implementations include systems and methods that generate a hash value for an input using multiplication and shuffling and a high degree of parallelism. Implementations take advantage of modern CPUs that use single instruction, multiple data (SIMD) instructions. The systems and methods generate a relatively secure hash value in about 0.25 CPU cycles per byte (c/b). While some non-cryptographic hash functions generate weaker hash values in 0.23 c/b (e.g., CityHash or Murmur3), systems running these conventional hash functions are vulnerable to collision and key extraction attacks, so must not be exposed to untrusted inputs. Cryptographic hash functions conventionally require 2-3 c/b. While not as strong as a cryptographic hash function, implementations generate a strong hash value that is resistant to collision, appears as random as other strong pseudo-random functions (e.g., SipHash), and executes much faster than conventional cryptographic hash functions and pseudo-random hash functions. Thus, implementations offer a hash function that is strong enough for most applications, and fast enough for large-scale applications.

Figure 1:
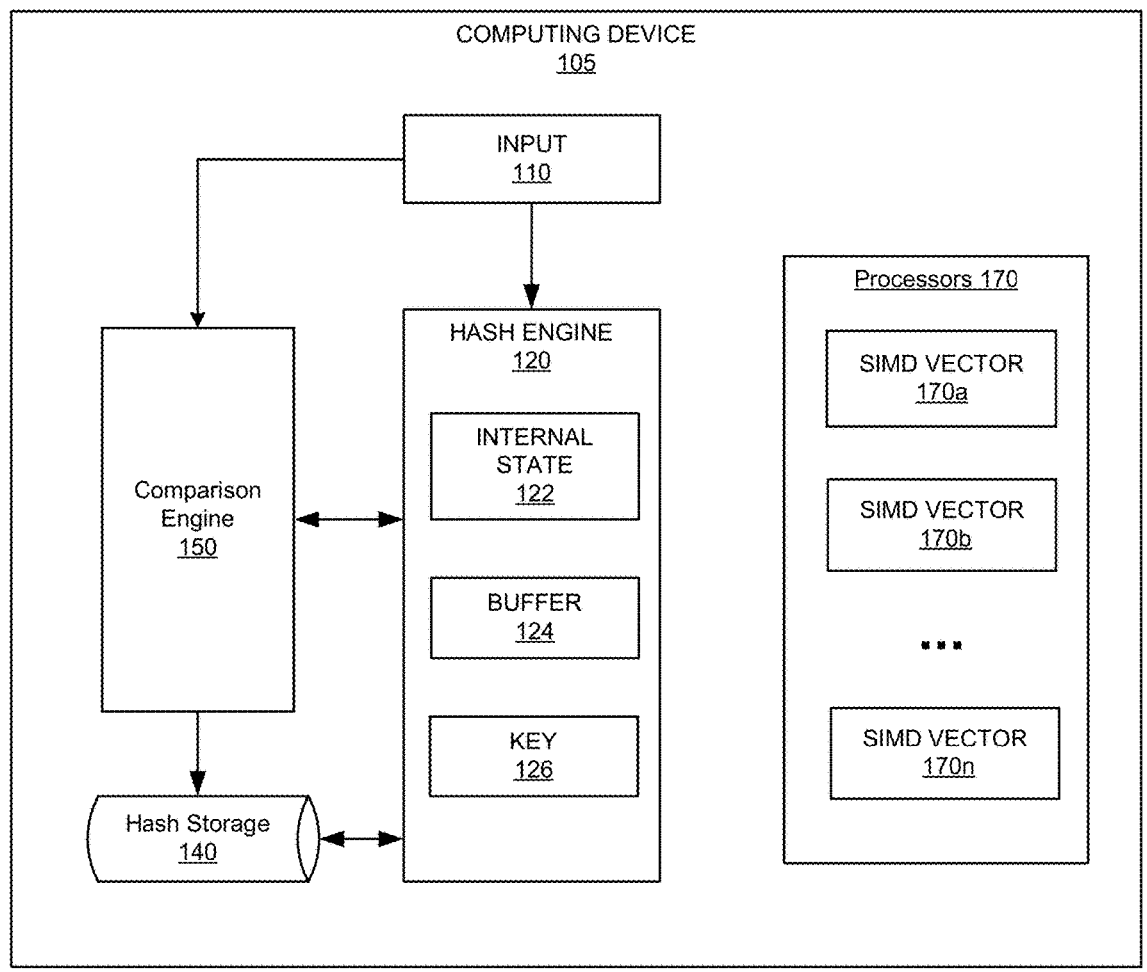
FIG. 1 is a block diagram illustrating an example system in accordance with the disclosed subject matter.

FIG. 1 is a block diagram of a multiplication-based hash system in accordance with an example implementation. The system 100 may be used to generate strong hash values with fewer processing cycles than conventional non-cryptographic hash functions. The depiction of system 100 in FIG. 1 is a single computing device but implementations may also move some of the components to a server, making system 100 a client-server system. In addition, one or more components may be combined into a single module or engine, and some capabilities of the illustrated components may be performed by separate engines. In some implementations, system 100 may be incorporated into a larger system or sub-system. Thus, implementations are not limited to the exact configurations illustrated. For purposes of clarity in discussing FIG. 1, italics will be used to distinguish numbers referring to a quantity of bits or bytes from numbers serving as labels in the figures.

Figure 8:
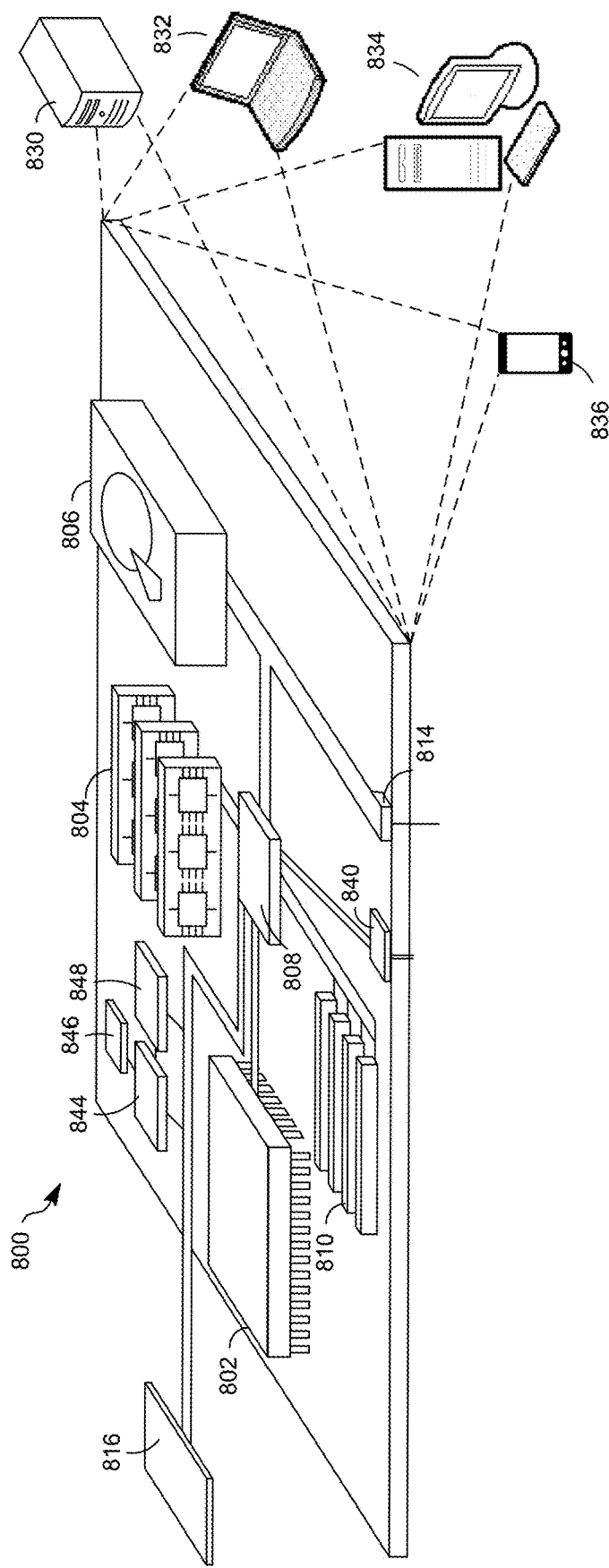
FIG. 8 shows an example of a computer device that can be used to implement the described techniques.
Figure 9:
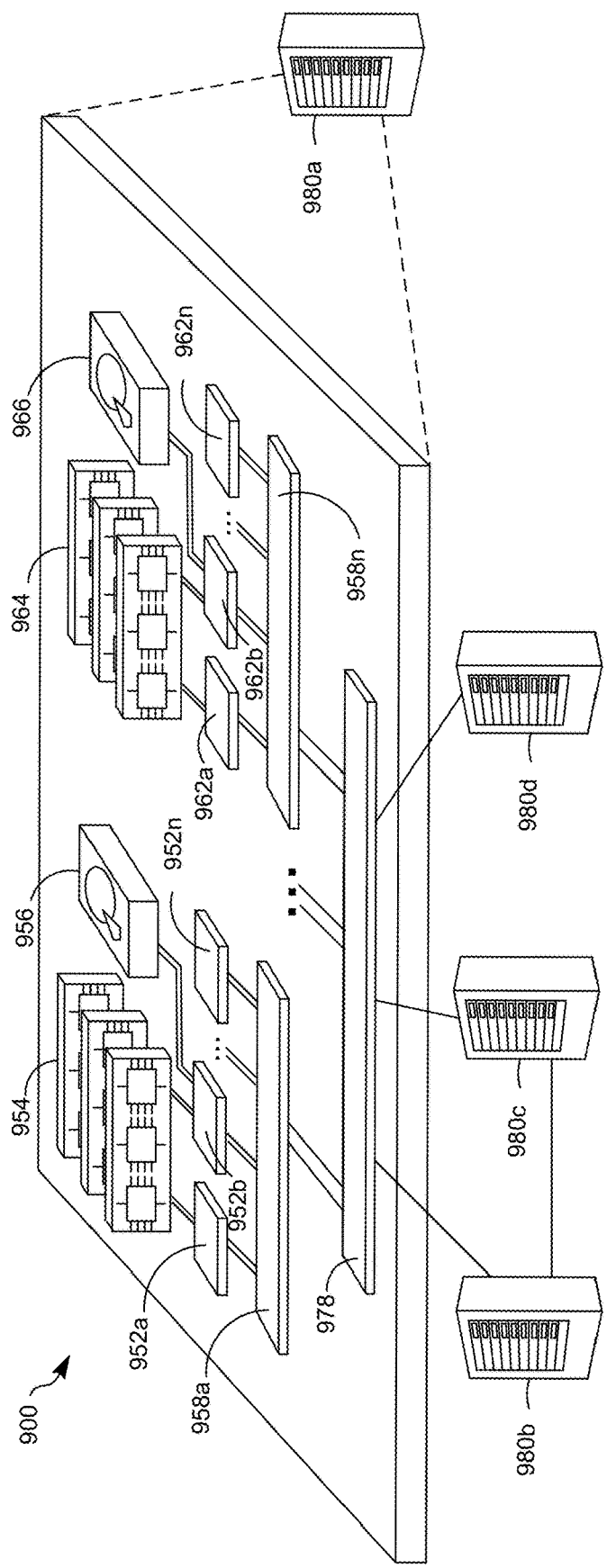
FIG. 9 shows an example of a distributed computer device that can be used to implement the described techniques.

The multiplication-based hash system 100 includes a computing device 105. The computing device 105 may be implemented in a personal computer, for example a laptop computer, a smart phone, a wearable device (smart watch, smart glasses, etc.), a game console, a home appliance, etc. The computing device 105 may be an example of computer device 800, as depicted in FIG. 8. The computing device 105 may also be a computing device or devices that take the form of a number of different devices, for example a standard server, a group of such servers, or a rack server system. For example, computing device 105 may be implemented in a distributed manner across multiple computing devices. In addition, computing device 105 may be an example of system 900, as depicted in FIG. 9.

The computing device 105 may include one or more processors 170 formed in a substrate configured to execute one or more machine executable instructions or pieces of software, firmware, or a combination thereof. The processors 170 can be semiconductor-based—that is, the processors can include semiconductor material that can perform digital logic. The processors 170 may include multiple processing elements that provide a parallel execution environment, i.e., processing elements that perform an operation on multiple data points simultaneously. In other words, the processors 170 may employ single-instructions, multiple data (SIMD) instructions. SIMD instructions apply the same operation to multiple lanes of a vector. For example, a vector may include four lanes, each of the same size, e.g., 64 bits. A processor 170 with one SIMD vector can perform the same operation (e.g., addition, multiplication, etc.) on the four lanes at the same time. The one or more processors 170 may include one or more SIMD vectors, e.g., SIMD vector 170a, SIMD vector 170b, SIMD vector 170n. In some implementations the vector lanes may be AVX2 (Advanced Vector Extensions 2) vector lanes, which is an expanded instruction set that works on 256 bit vectors.

The computing device 105 can also include one or more computer memories. The memories, for example, a main memory, may be configured to store one or more pieces of data, either temporarily, permanently, semi-permanently, or a combination thereof. The memories may include any type of storage device that stores information in a format that can be read and/or executed by the one or more processors. The memories may include volatile memory, non-volatile memory, or a combination thereof, and store modules or engines that, when executed by the one or more processors, perform certain operations. In some implementations, the modules may be stored in an external storage device and loaded into the memory of computing device 105.

The computing device 105 may include memory storing input 110. Input 110 may be any string or other digital content, e.g., a file, of any size. The input 110 represents the data to be hashed, or in other words, for which a hash value is calculated. The modules in the computing device 105 may include a comparison engine 150. The comparison engine 150 represents any process that uses a hash, e.g., a message checking process, a hash table generation/access process, a duplicate input detection process, a random number generator, a bloom filter, etc. While hash values are often used in comparisons, e.g., to determine if the input 110 has changed, to determine if the input 110 is a duplicate of some other input, to determine which row in a table to store information or from which row to retrieve information, the comparison engine 150 is understood to also include engines that employ one-time hash generation, e.g., for a random number. In some implementations, the comparison engine 150 may request a hash value be generated for the input 110. In some implementations, the comparison engine 150 may store the hash value for the input 110 in hash values 140. In some implementations the hash engine 120 may store the hash value for the input 110 in hash values 140. The hash values 140 may represent the result of the hash function performed by the hash engine 120 on a plurality of inputs 110. Although shown as part of computing device 105, comparison engine 150 and/or hash values 140 may also be remote from, but communicatively connected with computing device 105.

The modules of the multiplication-based hash system 100 may include the hash engine 120. The hash engine 120 may be configured to, for each unique input 110, initialize an internal state 122 using a key 126. The key 126 is some number not publicly known. The internal state 122 represents an internal hash sum that is manipulated by the hash engine 120 using the input 110 to generate the unique hash for the input 110. The internal state 122 is initialized using the key 126 and then manipulated using the input 110. The hash engine 120 is collision resistant, meaning that the hash value 140 generated for a particular input 110 should be different than the hash value 140 generated for a different input 110. In some implementations the internal state 122 is 1024 bits and the key 126 is 256 bits. At this size, attackers have a very low (e.g., 1 in $2^{256-64}$ chance) of guessing the key 126 after $2^{64}$ inputs. The hash engine 120 may use the key 126 to initially populate the 1024 bits of the internal state 122. In some implementations, the internal state 122 may be partitioned into four portions, each of 256 bytes. The partitions of the internal state 122 may also be referred to as internal state variables. The hashing engine may expand the key 126 into the first partition by performing an exclusive-OR (XOR) operation on the key 126 and a first constant. The hash engine 120 may expand the key 126 into the second portion by permuting the bytes of the key 126 (e.g., illustrated in FIG. 7) and then performing an XOR operation between the permuted key and a second constant. The result of this XOR operation may be stored in the second portion of the internal state 122. In some implementations the first constant may be stored in the third portion of the internal state 122 and the second constant may be stored in the fourth portion of the internal state 122. This is one example of how the hashing engine 120 may initialize the internal state 122 using the key 126. This particular initialization is provided as one example, but implementations are not so limited. Other initialization procedures may use other operations, or operations in a different order, to initialize the internal state 122 using the key 126.

The hash engine 120 uses multiplication and shuffling to update the internal state 122. Updating the internal state 122 includes injecting the data from the input into the internal state 122. Injecting the data from the input can be done via an addition operation or an XOR operation. After the input is injected, the hash engine 120 may mix the internal state 122. Conventionally, hash functions mix bits of the internal state 122 via addition and exclusive-OR (XOR) operations. The more thoroughly mixed, the stronger the hash. But thorough mixing can be computationally expensive, so weaker but faster hash functions conventionally have less mixing and stronger but slower hash functions have more mixing.

Implementations compute a strong hash quickly by using multiplication for mixing. In implementations that use SIMD lanes, the processor can perform multiplication in four lanes at once, with one half of a lane being the multiplicand supplied from a first vector variable and the other half of the lane being the multiplier supplied from a second vector variable. Thus, two vectors of 256 bits can be separated into four lanes and four 32 bit by 32 bit multiplication operations performed in parallel, with the least significant bits of each lane, e.g., 32 bits of each lane, being the multiplication operands. However, the mixing of the bits in each result of the four multiplication operations is uneven. More specifically, multiplication generates a result of mixed quality. For example, the bits in the high-order and low-order positions of the result are more predictable, i.e., of lower quality, than the bits in the middle. In other words, while the bits in the middle of the multiplication result are high quality and well mixed, the bits in the high-order and low-order positions of the result are low quality.

To address this unevenness, the hash engine 120 shuffles the bits of the multiplication results. The bit shuffling ensures that bits having the highest quality bits are relocated to locations that will propagate most widely in a next multiplication operation of the internal state 122. In some implementations the high quality bytes are moved to bytes that are the multiplier of the next multiplication. In some implementations, the multiplier bytes are the least significant bytes of a vector lane. To further increase the mixing of the internal state bytes, the shuffling may interleave adjacent vector lanes, so that some high quality bytes of one lane are moved to the neighboring lane, some low quality bytes of the lane are moved to the neighboring lane, and vice versa. Thus, the lanes are merged, with each lane receiving some low quality and some high quality bytes from the neighboring lane. This shuffling using interleaving of the lanes may be referred to as a zipperMerge( ) FIG. 5, discussed below, demonstrates an example of byte shuffling of the multiplication results that interleaves vector lanes. Shuffling may also include bit shuffling determined by an optimization algorithm.

The hash engine 120 may include a buffer 124. The buffer 124 may hold data from input 110 to be injected into the internal state 122. If the input 110 is less than the size of the buffer 124, the buffer 124 may be padded. For example, an input 110 of 122 bytes may be padded with 2 bytes so that the buffer 124 has data that is a multiple of the vector size, e.g., a multiple of 32 bytes. In other implementations, the hash engine 120 may pad the entire input buffer 124 with data, e.g., padding the input 110 of 122 bytes with 126 bytes. Similarly, an input 110 of 250 bytes may be padded with 6 bytes. Padding can occur in a number of ways, as discussed in more detail with regard to FIG. 2. The hash engine 120 may process the input buffer 124 in packets, the packet size being the size of a vector. For example, the packets may be 256 bits. The hash engine 120 may process the packets one at a time, updating the internal state 122 with the packet data. If the input 110 is longer than the size of the buffer 124, i.e., the input 110 does not fit into the buffer 124, the hash engine 120 may read the first 256 bytes of the input 110 into the buffer 124, process the data in the input buffer 124, and then read in the next 256 bytes of the input 110, processing that data, etc. Thus, the hash engine 120 processes the input 110 in chunks the size of the input buffer 124, and pads the input buffer 124 as needed when the last chunk is read into the buffer 124. The multiplication-based hash system 100 of FIG. 1 represents example configuration but implementations may incorporate other configurations.

Figure 2:
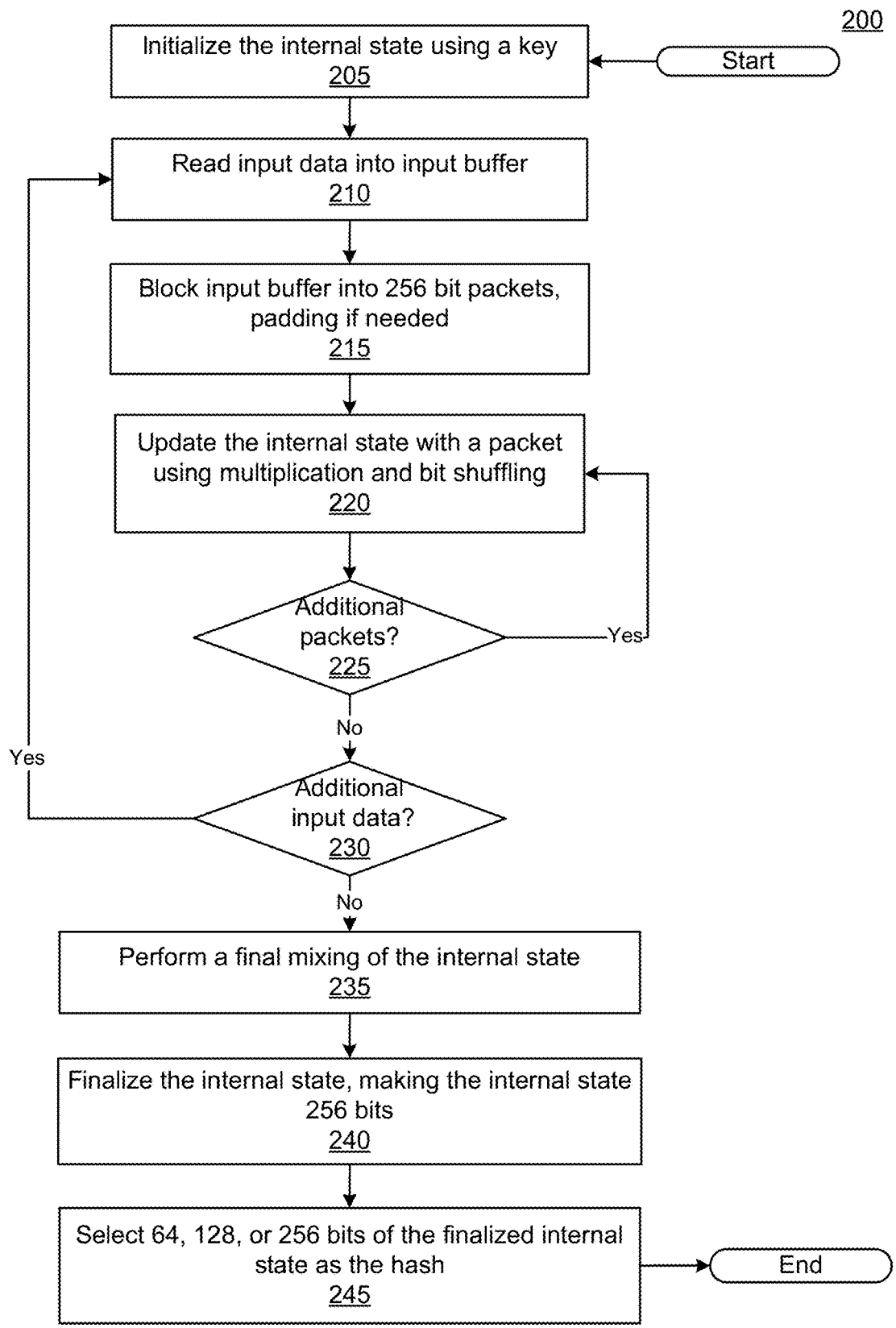
FIG. 2 illustrates a flow diagram of an example process for generating a fast, secure hash value, in accordance with disclosed implementations.

FIG. 2 illustrates a flow diagram of an example process 200 for generating a fast, secure hash value, in accordance with disclosed implementations. Process 200 may be performed by a multiplication-based hash system, such as system 100 of FIG. 1. In some implementations, process 200 is run by a hash engine, such as hash engine 120. Process 200 may be invoked by another program, e.g., comparison engine 150, that requests a hash for an input, e.g., input 110. Process 200 may generate a hash value for the input. The hash value may be used in various ways, depending on the calling program. Some uses may be as a random number, a hash-table lookup, message authentication, a bloom filter, etc., where security is desired but a cryptographic level of security is not required. Process 200 may execute once for each input for which a hash value is requested. The input can be a string, a message, a number, a document, or any other type of file or digital data.

Process 200 may initialize an internal state using a key (205). The key is provided by the program requesting the hash value. For a hash requested for authentication purposes, the key is conventionally unknown to attackers and generated by a secure source of randomness. For other purposes, the key can be public. The internal state is an internal hash sum that is initialized and then updated with the input and mixed to generate the hash value for the input. In other words, manipulations on the internal state using the input generate the hash value for the input. Because implementations use multiplication to mix the internal state, the initialization of the internal state should be configured to have a sufficient number of bits set, i.e., bits that are not zero. In some implementations, a sufficient number is reached when about half of the bits in each vector of the internal state are set. In some implementations, the system may set bits according to bit position. For example, in an internal state with four vectors, each vector having bit positions 0 to 255, the system may count the number of bits set at each of the given positions. If the system finds zero or one bits set at a given bit position, the system may set that bit position in the fourth vector to one. In some implementations, the internal state is 1024 bits and the key is 256 bits. Internal states that are smaller than 1024 bits are useful for CPUs that do not have 256 bit vectors, but smaller internal states are more prone to collisions. Internal states larger than 1024 bits increase processing time without a proportional benefit.

Initialization of the internal state using the key includes expanding the key to populate the larger internal state. Initialization can take several forms, so long as the internal state, once initialized, has sufficient bits set (i.e., set to one). In some implementations, the internal state may be partitioned into four equally-sized portions, also referred to as variables. With a 1024 bit internal state each partition or variable is 256 bits, which is the size of a SIMD vector. Thus, SIMD operations can be performed on any of the internal state variables. In some implementations, the system may set a first variable and a second variable using the key. For example, the system may initialize the first variable (e.g., labeled v0) to the result of an XOR operation or an addition operation between the key and a first constant. The system may initialize the second variable (e.g., labeled v1) to the result of an XOR or addition operation between a permutation of the key using SIMD instructions and a second constant. In some implementations, the system may permute the key by swapping the 128-bit vector halves and also the 32-bit lane halves of the key (which is the size of a vector). An example of permutation is illustrated in FIG. 7. The permutation operation may be the same as the permutation operation used in a final mixing of the internal state, as discussed with regard to FIG. 6. In some implementations, the third variable (e.g., labeled mul0) may be set to the first constant and the fourth variable (e.g., labeled mul1) may be set to the second constant. These examples are provided as one example of initialization of the internal state, but implementations are not limited to the initialization described. As indicated above, the system may use any initialization based on the key that results in sufficient bits being set.

The system may then read input data into the input buffer (210). The input buffer is a multiple of the size of a vector. In some implementations, the input buffer is 256 bytes and the vector is 32 bytes (256 bits). While the remainder of the explanation of process 200 assumes a buffer of 256 bytes, implementations can have input buffers of larger or smaller size. If the input data is larger than 256 bytes only the first 256 bytes is read into the buffer.

The system blocks the input buffer into packets the size of the vector, e.g., into 256 bit (32 byte) packets. (215). If the input data is less than 256 bytes, or if the remainder of the input data is less than 256 bytes, the system may pad the last packet of the input buffer. In other words, if the input data is 34 bytes (or the remainder of the input data is 34 bytes) and the vector size is 32 bytes, the system pads at least 30 bytes in the input buffer, so that the input buffer includes data for two complete packets. In some implementations, the system may pad the remaining 222 bytes of the input buffer, but this lengthens the processing time for generating the hash. The padding ensures that the data provided to the vector operations that update the internal state are controlled and hash values repeatable for the same input. The system may pad the packets using one of a variety of methods.

In some implementations, the system may encode the length of the padding into the packet. For example, the system may insert the size modulo 256, encoded in a single byte, into the padded bytes. As another example, the system may insert the size modulo 32. Thus, the value of the padded bytes is set based on the number of bytes to be padded. In some implementations, the system may not pad the input buffer with the length, but may modify the internal state directly when a packet from the input buffer is less than the vector size. For example, the system may inject the quantity of bytes to be padded when the packet is injected into the internal state, e.g., as a first step in updating the state with the packet. The system may calculate the quantity of bytes to be padded by calculating the size of the packet modulo 32. In some implementations, the system may then add this number to every half-lane in a portion of the internal state, e.g., in v0, and then rotate each half-lane of another portion of the state by that number, e.g., in v1. In some implementations, the system may select one or more bytes from some known position and use those bytes to pad the packet. For example, the system may use a _mm_maskload_epi32 instruction to load multiples of four bytes from an intermediate buffer into the packet. If remaining bytes to be padded is not a multiple of four, the system may load one to three bytes individually, e.g., using a single conditional branch. In this manner the system may set a value of each of the bytes to be padded to the value of one of the four bytes in the intermediate buffer.

Once the input buffer is blocked into packets, the system may begin updating the internal state using the packets, one packet at a time (220). Updating the internal state with a packet includes injecting the packet into the internal state, mixing the bits of the internal state using multiplication, and shuffling the bits in the result of the multiplication so that high quality bits from the multiplication result are placed in locations that will propagate most widely in the next permutation. In some implementations, the multiplier propagates most widely. In some implementations, the system may use an optimization algorithm to choose the shuffling order so that the result of repeated multiplications and shuffling has maximum entropy. The update process is described in more detail with regard to FIG. 3. The system updates the internal state with each packet from the input buffer, so if there are additional packets that have not been used to update the internal state (225, Yes), the system obtains the next packet and updates the internal state with that packet (220). Once all packets have been used to update the internal state (225, No), the system determines whether all input data has been read into the input buffer (230). If there is additional data from the input to read into the buffer (230, Yes), the system repeats steps 210 to 230 with the next 256 bytes of input.

Once all input data has been processed (230, No), the system may perform a final mixing of the internal state (235). In some implementations, the final mixing may occur by updating the internal state using the internal state. In other words, the system may treat one or more portions of the internal state as a packet used to update the internal state, e.g., as described in step 220. This further mixing of the internal state reduces the risk of key leakage. The system may perform several rounds of mixing, as described in more detail with regard to FIG. 6. In some implementations, the system may also permute the internal state between rounds, also as described with regard to FIG. 6.

Once the final mixing of the internal state is finished, the system may finalize the state by reducing the internal state from 1024 bits to 256 bits (240). In some implementations, the system may, if the internal state is not already partitioned into four partitions, partition the internal state into four equal-sized partitions and combine the four partitions. For example, the system may add together the four portions, which reduces the internal state from 1024 bits to 256 bits. As another example, the system may XOR the four portions, which also reduces the internal state from 1024 bits to 256 bits. As another example the system may reduce the internal state from 1024 bits to 512 bits by adding or XORing the two halves of the internal state together. The system may then select the hash value from the finalized state (245). If a 64-bit hash value is desired, the system may retain 64 bits of the finalized state. In some implementations, the system may use the 64 bits in the lower lane, which is slightly easier to extract from SIMD registers into general purpose registers. If a longer hash value is desired, the system may provide the desired length, e.g., 128 bits or all 256 bits of the finalized internal state, as the hash value. Thus, the system can provide a 64-bit hash to a 256-bit hash without increasing the processing time. Depending on how the hash value is used, it may be stored or used to compare against a stored hash value. Process 200 then ends.

Figure 3:
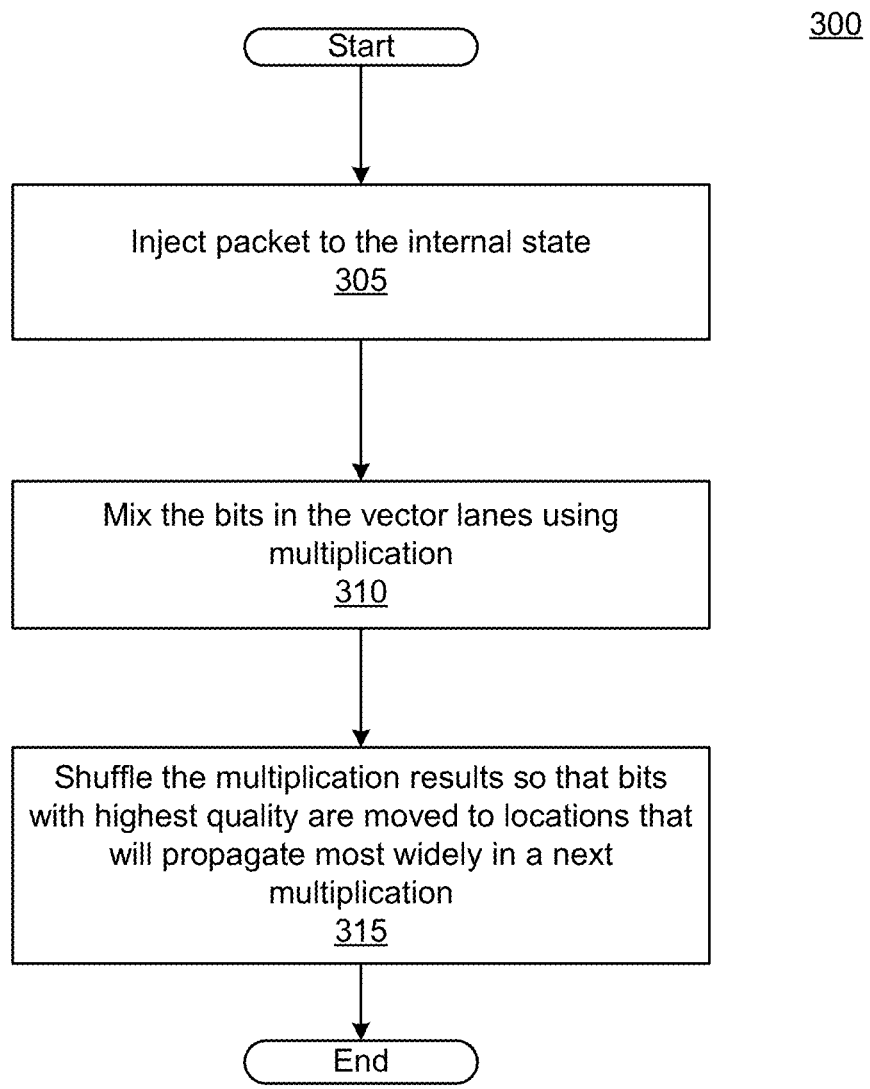
FIG. 3 illustrates a flow diagram of an example process for updating the internal state of the hash, in accordance with disclosed implementations.

FIG. 3 illustrates a flow diagram of an example process 300 for updating the internal state of the hash using multiplication and bit shuffling, in accordance with disclosed implementations. Process 300 may be performed as part of step 220 of FIG. 2. Process 300 may have access to the internal state and may take, as a parameter, a packet to be injected into the internal state, which is then mixed by multiplication and the multiplication result shuffled, so that the high-quality bits of the multiplication result are moved to positions that will propagate most widely in a next update of the internal state.

Process 300 begins by injecting the packet into the internal state (305). Injecting is conventionally accomplished via an addition operation or an XOR operation. Thus, the system may add or XOR the packet with the internal state. In some implementations, the system may inject the packet into a particular portion of the internal state.

For example, where the internal state comprises four equal sized portions, the system may inject the packet into one of the portions, e.g., v1. In some implementations, the system may also inject a second portion of the internal state, e.g., mul0, into the v1 portion.

The system may mix the bits of the internal state via multiplication (310). In some implementations, the system may mix portions of the internal state using multiplication, and use other areas of the internal state to hold the result of the multiplication. In some implementations, the system may, as part of holding the result, inject the multiplication result into the data already in that portion of the internal state. For example, as explained above, the internal state may be stored as four variables. The system may multiply these portions together. More specifically, using SIMD instructions, the system may multiply the lowest four vector elements, which is the lower 32 bits of each 64-bit lane, of a first portion (e.g., v0) with the highest four elements, which is the higher 32 bits of each 64-bit lane, of a second portion (e.g., v1), e.g., using a _mm256_mul_epu32( ) SIMD instruction and inject the result in another portion of the state, e.g., mul0. Likewise, the system may multiply the lowest four vector elements, which is the lower 32 bits of each 64-bit lane, of the second portion (e.g., v1) with the highest four elements, which is the higher 32 bits of each 64-bit lane, of a second portion (e.g., v0), e.g., using a _mm256_mul_epu32( ) SIMD instruction and inject the result in another portion of the state, e.g., mul1. In addition, the system may further modify the internal state by injecting one portion of the state into another portion, e.g., injecting mul1 into v0, or the like.

The system may then shuffle the multiplication results so that bits with highest quality are moved to locations that will propagate most widely in a next round of multiplication (315). This shuffling may include interleaving the bytes of adjacent vector lanes. Thus, the shuffling may be referred to as a zipper merge. One example of the shuffling is explained in more detail below with regard to FIG. 5. In some implementations, the system may use an optimization algorithm to choose the shuffling order so that the result of repeated multiplications and shuffling has maximum entropy. In other words, the optimization algorithm used in shifting may enable a single bit change in the internal state or in the input data may have a maximum expected entropy on the internal state. In some implementations, the optimization algorithm may be a search algorithm that tries all combinations and chooses the best. In some implementations, the optimization algorithm may be a genetic algorithm or another stochastic search. After shuffling, process 300 ends. Process 300 represents an update performed on the internal state.

FIG. 4 is a pseudo-code example of a process for updating the internal state of the hash using multiplication and shuffling, in accordance with disclosed implementations. Example 400 is one example implementation of process 300 of FIG. 3. In the example of FIG. 4, the internal state 122 is represented by four variables, each of 256 bits (or 32 bytes). The four variables are v0, v1, mul0, and mul1. In the example of FIG. 4, the packet provided to the process is injected into v1, as illustrated at 405. V1 may be further modified by injection of the mul0 variable. The mul0 variable may then be modified via multiplication of the lower four elements of v1 multiplied by the upper four elements of v0. The upper four elements of v0 are shifted, so that they move into the lower four elements, because the SIMD instruction illustrated in example 400 operates on the lowest four elements of the vector. The v0 variable is then injected with the mul1 variable and then mul1 is then modified via multiplication of the lower four elements of v0 multiplied by the upper four elements of v1 (again, shifting the upper elements of v1 into the lower 4 elements). The modification of the internal state using multiplication is thus represented by 410 of FIG. 4. The system may then shuffle the multiplication results so that bits with highest quality are moved to locations that will propagate most widely in a next multiplication. This shuffling is represented by items 415 of FIG. 4. The ZipperMerge( ) function interleaves two adjacent lanes of the vector and, at the same time, moves the higher quality bytes to the least significant bits of the vector lane.

Figure 5:
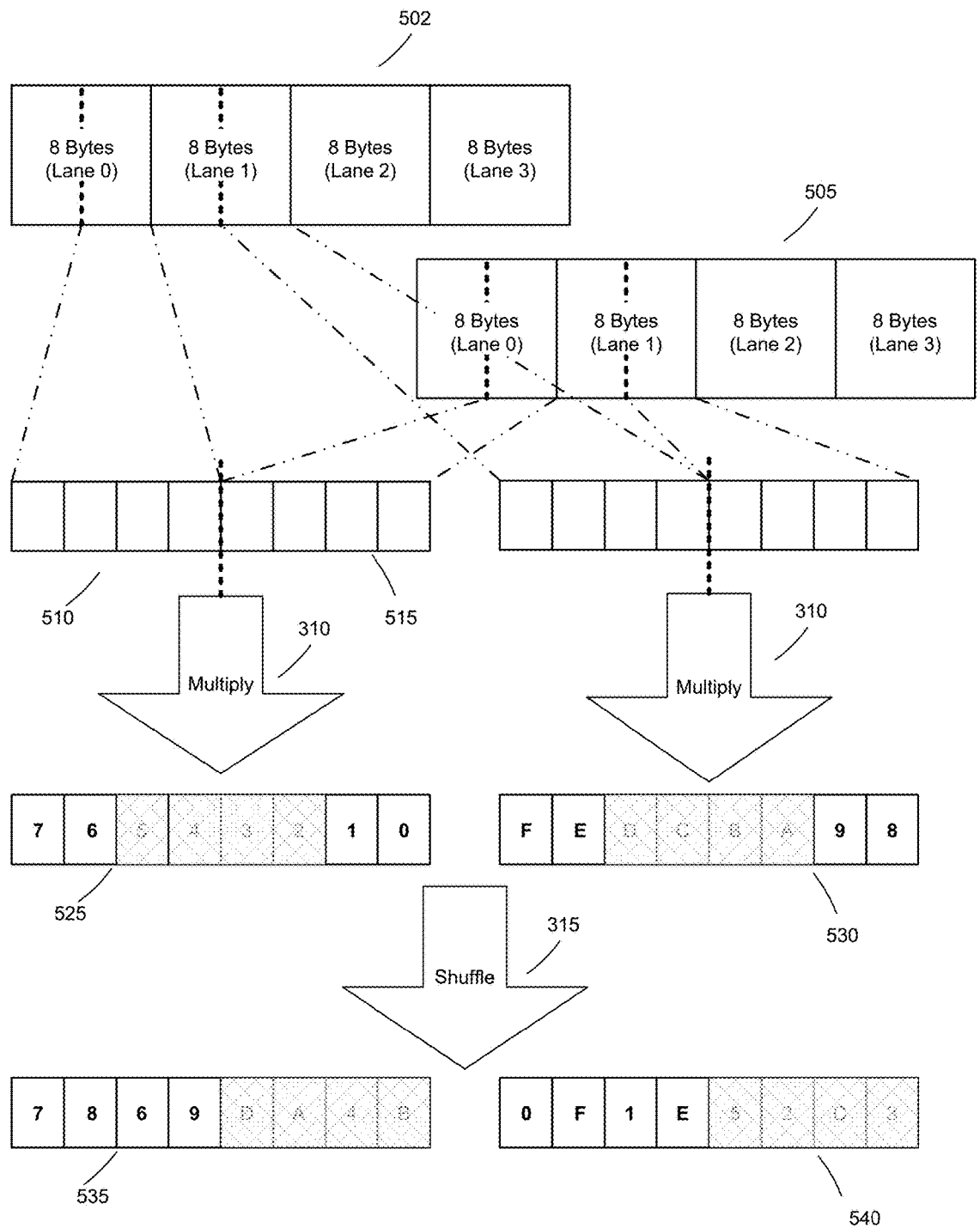
FIG. 5 is a block diagram illustrating the use of multiplication and byte shuffling to modify an internal state variable in a parallel processing environment, in accordance with disclosed implementations.

FIG. 5 is a block diagram illustrating the use of multiplication and shuffling to modify an internal state variable in a parallel processing environment, in accordance with disclosed implementations. In FIG. 5, two vectors, 502 and 505, each include four lanes, each lane of 8 bytes. The vectors 502 and 505 are thus each 256 bits. In some implementations, the SIMD instructions operate on four 64-bit lanes. Thus, each 8 bytes of the vector are assigned to a lane. The system can perform the same operation on all four lanes. Thus, for example, the system can perform four multiplication operations in parallel, each 32×32 bits. Each vector provides the 32 least significant bits in each lane for multiplication. Thus, in lane 0, the 32 bits of vector 502 is the multiplicand, designated by 510, and the 32 bits of vector 505 is the multiplier, designated by 515. Similarly in lane 1 the least significant 32 bits of vector 502 is multiplied by the least significant 32 bits of vector 505. FIG. 5 illustrates the multiplication 310 of two neighboring lanes for the sake of brevity, but it is understood that the system may perform the multiplication across all four lanes in parallel.

In the example of FIG. 5 the result of the multiplication in lane 0 in result 525 and the result of the multiplication in lane 1 in result 530. The bytes of the result 525 are labeled as 0 through 7, and the bytes of the result 530 are labeled as 8 through F. These labels represent byte positions for the ease of discussion and not the actual multiplication results. The middle bytes of the multiplication result, e.g., 2-5 of result 525 and A-D in result 530 are of higher quality than the bytes at either end. The higher quality bytes are more thoroughly mixed and less predictable than the lower quality bytes. Although FIG. 5 illustrates the result of the multiplication being provided directly to the shuffling, implementations are not so limited. For example, the result may undergo some type of injection (addition or XOR) prior to permutation, as illustrated in FIG. 4.

To achieve more even mixing, the system shuffles the middle bytes of the results 525 and 530, illustrated with shading in FIG. 5, to the multiplier positions, so that the multiplier bytes are uniformly good. This operation is an example of a zipperMerge( ) e.g., item 415 of FIG. 4 or the shuffling step 315 of FIG. 3. In addition to concentrating the higher quality bytes (e.g., byte positions 2-5 and A-D) into the multiplier, the system also increases mixing by interleaving bytes of similar quality from the neighboring SIMD lane. Thus, for example, the high quality bytes in positions A, B, and D are moved from lane 1 to lane 0 and the high quality bytes in positions 2, 3, and 5 are moved from lane 0 to lane 1. Similarly, the low-quality bytes are concentrated in the multiplicand and interleaved. Thus, for example, bytes in position 8 and 9 are moved from lane 1 to lane 0 and bytes 0 and 1 are moved from lane 0 to lane 1. The result of the shuffling of the high quality bytes is represented in the example of FIG. 5 as 535 and 540, which represent half of the vector. Although not shown in FIG. 5 for the sake of brevity, a similar shuffling occurs between lanes 2 and 3. Thus, the shuffling operates on all 32 bytes of the vector.

Figure 6:
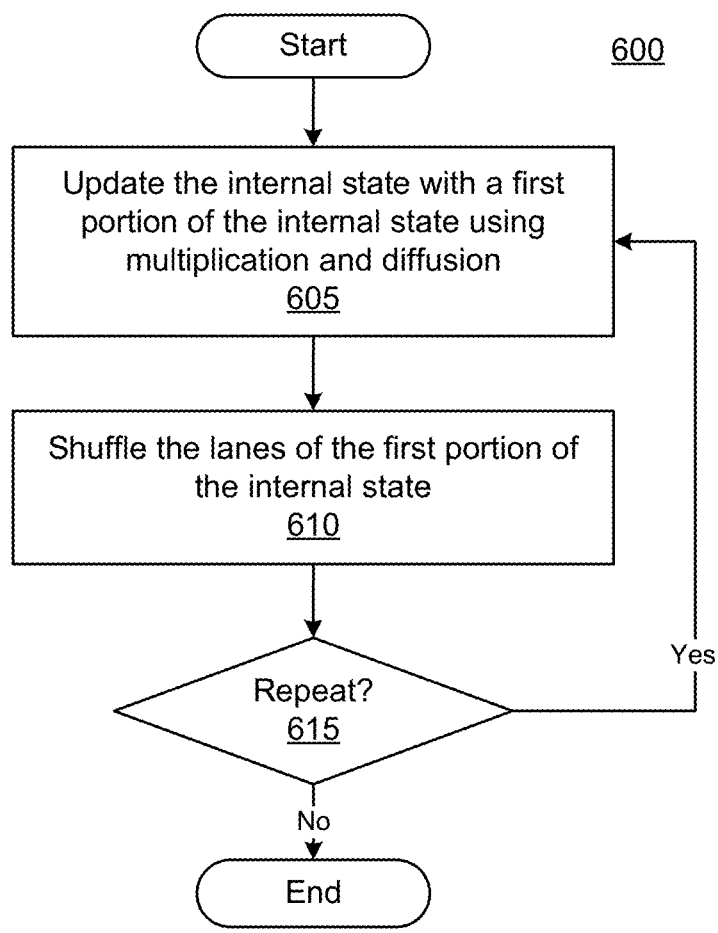
FIG. 6 illustrates a flow diagram of an example process for a final mixing of the internal state of the hash, in accordance with disclosed implementations.
Figure 7:
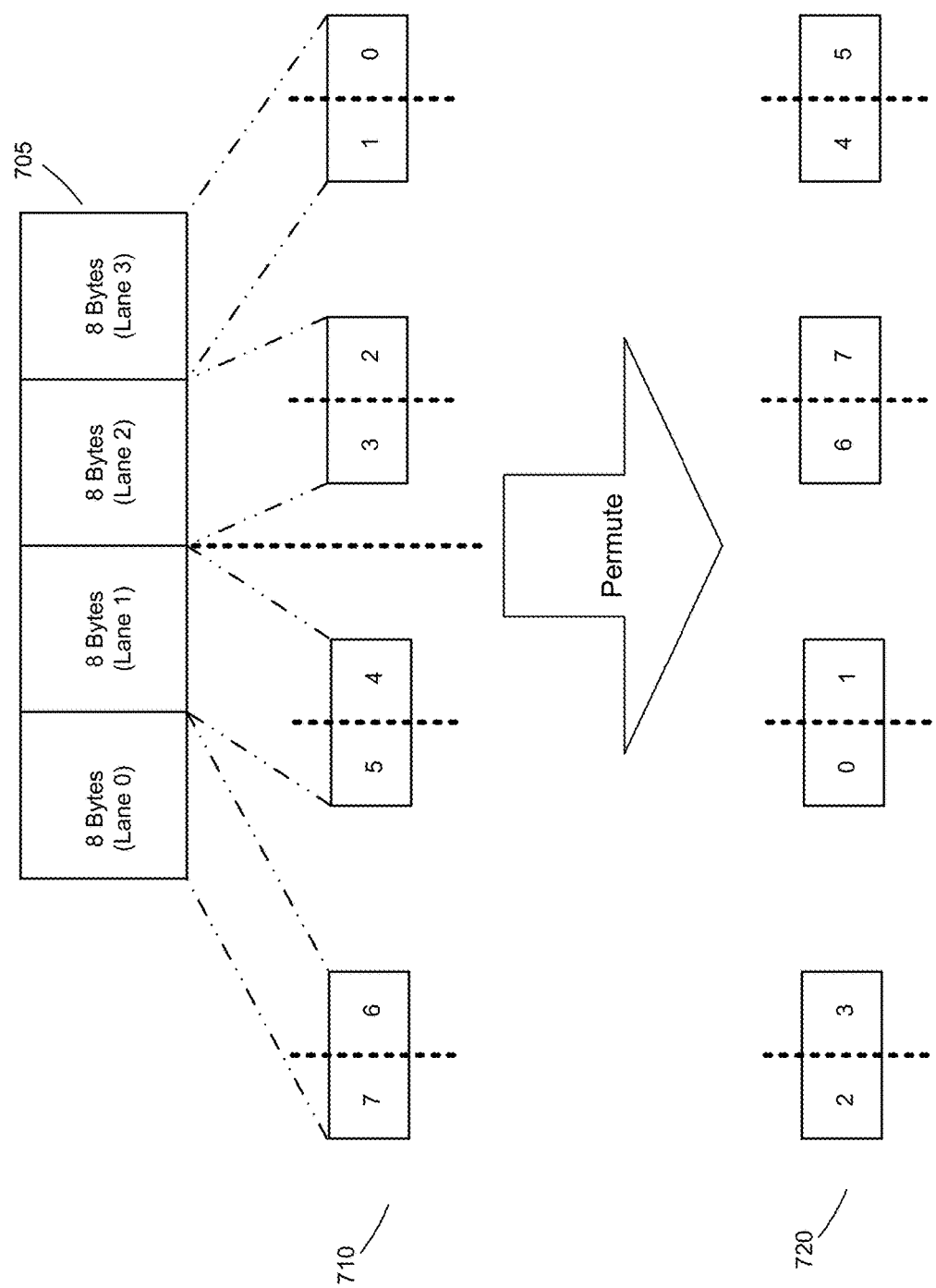
FIG. 7 is a block diagram illustrating a permutation used to increase mixing of the internal state of the hash, in accordance with disclosed implementations.

FIG. 6 illustrates a flow diagram of an example process 600 for a final mixing of the internal state of the hash, in accordance with disclosed implementations. Process 600 may be performed as part of step 235 of FIG. 2. Process 600 further mixes the bits of the internal state by updating the internal state with the internal state, and may include a permutation in between update rounds. Further mixing the internal state reduces the risk of key leakage and reduce avalanche bias.

Process 600 may begin by updating the internal state with the internal state (605). This update process is the same as the update process described above with regard to FIG. 4, but instead of providing input data as the packet, the system provides a portion of the internal state as the packet. In other words, the system may treat one or more portions of the internal state as a packet used to update the internal state. For example, if the internal state includes four variables, the system may use a first portion (e.g., v0) as a packet used to update the internal state, e.g., as described in step 220 and FIG. 4. In some implementations, the system may also use a second portion as a packet used to update the internal state, e.g., mul0 and/or mul1. Because the update injects the packet into a portion of the state (e.g., v1) before multiplication, that portion of the state may not be used as a packet in process 600.

In some implementations, the system may submit the internal state, or a portion thereof (e.g., v0) to a permutation (610). The portion(s) of the state used as the packet in step 605 may be permuted. The permutation ensures that the upper vector lanes are mixed into the final result. The permute may shuffle the lanes using a SIMD operation, e.g., _mm256_permutevar8×32_eip32. In some implementations, the system may swap the 128-bit vector halves (e.g., lanes 0/1 and lanes 2/3) and also 32-bit lane halves. The permutation may be performed on the variable used as the packet in step 605 (e.g., v0). FIG. 7 illustrates an example permutation.

In some implementations, the system may repeat the update and permutation for a number of rounds (615). For example, the system may repeat step 605 and 610 three to four times. Each update of the internal state with a permutation may be considered a round. Repeating the update and permutation for more than four rounds does not have a measurable impact on the average bias, so consumes processing cycles without providing much benefit to the strength of the hash value. Once all rounds have been completed (615, No.), process 600 ends.

FIG. 7 is a block diagram illustrating a permutation used to increase mixing of the internal state of the hash, in accordance with disclosed implementations. For example, a vector 705 of 256 bits (e.g., v0) may be provided for permutation. The vector 705 represents four lanes of 64-bits, or eight half-lanes of 32 bits. In the example of FIG. 7 the half-lanes are labeled 0 to 7 at 710. These labels do not represent the bit values, just a label for each half-lane. Before the permutation, the half-lanes are ordered 7 6 5 4 3 2 1 0. The permutation re-orders the half-lanes by swapping the two 128-bit halves and swapping the 32-bit half-lanes. Thus, the shuffling may re-order the half-lanes so that the half-lanes are now ordered 2 3 0 1 6 7 4 5, as illustrated at 720. This result, illustrated at 720 is the result of the permutation of the vector 705 provided. The permutation of FIG. 7 can be used during initialization of the state, e.g., to permute the key, and in between rounds of the final mixing of the internal state. Of course, FIG. 7 is one example of the permutation and implementations can include other similar permutation patterns.

Implementations provide a hash with speed that is similar to or slightly slower than completely insecure non-cryptographic hashes, but faster than semi-secure hashes, such as SipHash and much faster than fully secure cryptographic hashes. Table 1 lists throughputs for several input sizes in CPU cycles per byte. For 1 KB inputs, implementations are 3.8 times as fast as SipHash. Reducing SipHash rounds from 2 per update and 4 during initialization to 1 and 3 also increases it throughput by a factor of 1.2 to 2.

TABLE 1

| Algorithm | 8 | 31 | 32 | 63 | 64 | 1023 |
|---|---|---|---|---|---|---|
| SipHash | 8.13 | 2.58 | 2.73 | 1.87 | 1.93 | 1.26 |
| SipHash13 | 6.96 | 2.09 | 2.12 | 1.32 | 1.33 | 0.68 |
| HighwayHash SSE41 | 8.00 | 2.11 | 1.75 | 1.13 | 0.96 | 0.30 |
| HighwayHash AVX2 | 7.34 | 1.81 | 1.71 | 1.04 | 0.95 | 0.24 |

Throughput generally increases for larger inputs because the finalization cost is amortized over more data. Implementations outperform SipHash due to efficient finalization (e.g., steps 235 and 240) and optimized padding.

Figure 10:
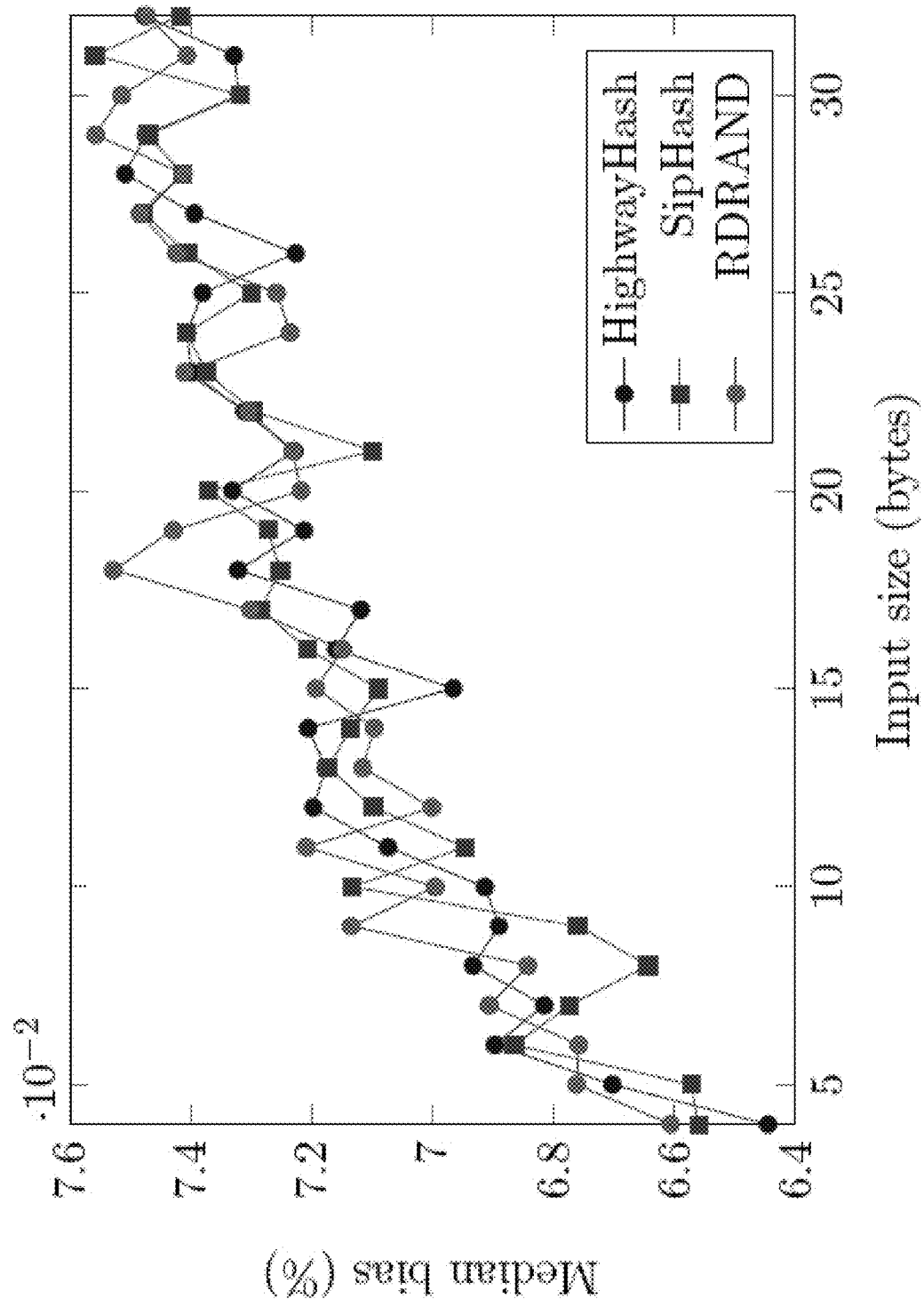
FIG. 10 is a graph illustrating median avalanche bias of a disclosed implementation compared to SipHash and RDRAND.

Implementations were tested via a smasher test suite that verifies their output distribution and checks for collisions when hashing difficult inputs. Some fast hashes, such as CLHash (without additional mixing) fail the avalanche test, which requires that half of the output bits change when an input bit is flipped. The avalanche test is considered successful if each output bit has a bias (deviation from the expected 50% bit flip rate) of less than 1%. FIG. 10 illustrates median avalanche bias (the percent difference between ideal and actual bit-flip probability for 4-32 byte keys) in HighwayHash, SipHash as well as RDRAND, which is Intel's cryptographically secure generator based on an AES block cipher, periodically reseeded from observations of thermal noise. The graph of FIG. 10 was generated from 49 independent trials with random inputs and keys. Notably, FIG. 10 illustrates HighwayHash has a bias indistinguishable from that of the hardware random generator.

Table 1 and FIG. 10 demonstrate that implementations provide a hash function that is fast but fairly secure, with at least 64 bits of security and expected resistance against differential attacks, but lower margins of safety than cryptographic hashes.

A paper by Alakuijala et al., titled "Fast keyed hash/pseudo-random function using SIMD multiply and permute" first published at https://arxiv.org/abs/1612.06257, on Dec. 19, 2016, is also included here by reference. The paper describes one implementation of the disclosed subject matter.

FIG. 8 shows an example of a generic computer device 800, which may be operated as server 110, and/or client 150 of FIG. 1, which may be used with the techniques described here. Computing device 800 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 800 includes a processor 802, memory 804, a storage device 806, and expansion ports 810 connected via an interface 808. In some implementations, computing device 800 may include transceiver 846, communication interface 844, and a GPS (Global Positioning System) receiver module 848, among other components, connected via interface 808. Device 800 may communicate wirelessly through communication interface 844, which may include digital signal processing circuitry where necessary. Each of the components 802, 804, 806, 808, 810, 840, 844, 846, and 848 may be mounted on a common motherboard or in other manners as appropriate.

The processor 802 can process instructions for execution within the computing device 800, including instructions stored in the memory 804 or on the storage device 806 to display graphical information for a GUI on an external input/output device, such as display 816. Display 816 may be a monitor or a flat touchscreen display. In some implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk. In some implementations, the memory 804 may include expansion memory provided through an expansion interface.

The storage device 806 is capable of providing mass storage for the computing device 800. In one implementation, the storage device 806 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 804, the storage device 806, or memory on processor 802.

The interface 808 may be a high speed controller that manages bandwidth-intensive operations for the computing device 800 or a low speed controller that manages lower bandwidth-intensive operations, or a combination of such controllers. An external interface 840 may be provided so as to enable near area communication of device 800 with other devices. In some implementations, controller 808 may be coupled to storage device 806 and expansion port 814. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 830, or multiple times in a group of such servers. It may also be implemented as part of a rack server system. In addition, it may be implemented in a computing device, such as a laptop computer 832, personal computer 834, or tablet/smart phone 836. An entire system may be made up of multiple computing devices 800 communicating with each other. Other configurations are possible.

FIG. 9 shows an example of a generic computer device 900, which may be server 110 of FIG. 1, which may be used with the techniques described here. Computing device 900 is intended to represent various example forms of large-scale data processing devices, such as servers, blade servers, datacenters, mainframes, and other large-scale computing devices. Computing device 900 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 900 may include any number of computing devices 980. Computing devices 980 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 980a includes multiple racks 958a-958n. Each rack may include one or more processors, such as processors 952a-952n and 962a-962n. The processors may include data processors, network attached storage devices, and other computer controlled devices. In some implementations, one processor may operate as a master processor and control the scheduling and data distribution tasks. Processors may be interconnected through one or more rack switches 958, and one or more racks may be connected through switch 978. Switch 978 may handle communications between multiple connected computing devices 980.

Each rack may include memory, such as memory 954 and memory 964, and storage, such as 956 and 966. Storage 956 and 966 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 956 or 966 may be shared between multiple processors, multiple racks, or multiple computing devices and may include a computer-readable medium storing instructions executable by one or more of the processors. Memory 954 and 964 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 954 may also be shared between processors 952a-952n. Data structures, such as an index, may be stored, for example, across storage 956 and memory 954. Computing device 980 may include other components not shown, such as controllers, buses, input/output devices, communications modules, etc.

An entire system, such as system 100, may be made up of multiple computing devices 980 communicating with each other. For example, device 980a may communicate with devices 980b, 980c, and 980d, and these may collectively be known as system 100. As another example, system 100 of FIG. 1 may include one or more computing devices 980. Some of the computing devices may be located geographically close to each other, and others may be located geographically distant. The layout of system 900 is an example only and the system may take on other layouts or configurations.

According to certain aspects of the disclosure, a computer system includes at least one processor and memory storing instructions that, when executed by the at least one processor, causes the computer system to perform operations. The operations include reading an input file into an input buffer, blocking the input buffer into packets, and for each of the packets, updating an internal state using the packet. Updating the internal state using the packet can include injecting the packet into the internal state, mixing the internal state using multiplication, and shuffling a result of the multiplication so that bits with highest quality are permuted to locations that will propagate most widely in a next multiplication operation. The operations may also include updating the internal state with a packet-sized portion of the internal state, finalizing the state, and storing a portion of the final internal state as a hash of the input file. Updating the internal state with a packet-sized portion of the internal state may include injecting the packet-sized portion into the internal state, mixing the internal state using multiplication, and shuffling the result of the multiplication so that bytes with highest quality are permuted to locations that will propagate most widely in a next multiplication operation.

This and other aspects can include one or more of the following features. For example, the mixing by multiplication may be performed on 256 bits in parallel using four Single Instruction Multiple Data (SIMD) vector lanes. In some implementations, the shuffling causes bits with higher quality to be moved to least significant byte positions of a SIMD vector lane and remaining bytes to be moved to most significant bytes positions of the SIMD vector lane. In some implementations, the shuffling interleaves neighboring vector lanes so that at least some highest quality bytes from a first lane of the neighboring lanes and at least some highest quality bytes from a second lane of the neighboring lanes are moved to a location in the first lane. As another example, an optimization algorithm may control the shuffling. As another example, the packets are 256 bits, the input buffer is 256 bytes and the internal state is 1024 bits. As another example, finalizing the internal state can include reducing a size of the internal state by four by adding together four equal-sized portions of the internal state. As another example, the portion stored as the hash is the entire final state. As another example, the portion stored as the hash is a portion in a lower lane of a 4-lane Single Instruction Multiple Data (SIMD) processor.

As another example, when the input is not a multiple of 32 bytes, operations can also include determining a quantity of bytes to be padded and setting a value of the bytes to be padded to a number that represents the quantity. As another example, when the input is not a multiple of 32 bytes, the operations may include determining a quantity of bytes to be padded and updating the internal state based on the quantity. In some implementations, the operations may also include repeating the updating of the internal state with a packet-sized portion at least two additional times. As another example, the operations may include, when the input file exceeds a size of the input buffer, repeating the reading, blocking, and updating of the internal state with each of the packets until reaching an end of the input file, wherein updating the internal state with the packet-sized portion occurs after reaching the end of the input file. As another example, the operations may include initializing the internal state with a key. As another example, when the input is not a multiple of 32 bytes, the operations may include determining a value of a byte at a particular position; and setting a value of each of the bytes to be padded to the value of the byte at the particular position.

According to certain aspects of the disclosure, a method includes, for each of a plurality of packets, each packet including data from an input to be hashed, injecting the packet into an internal state that represents an internal hash sum, mixing the internal state using multiplication, and shuffling the result of the multiplication so that bytes with highest quality are moved to locations that will propagate most widely in a next multiplication operation. The method may also include further mixing the internal state using multiplication after processing the plurality of packets and providing, to a requesting process, a portion of the final internal state as a hash of the input.

These and other aspects can include one or more of the following features. For example, further mixing the internal state using multiplication can include injecting a packet-sized portion of the internal state into the internal state, mixing the internal state using multiplication, and shuffling the result of the multiplication so that bytes with highest quality are permuted to locations that will propagate most widely in a next multiplication operation. In some implementations, further mixing the internal state using multiplication includes repeating the injecting, mixing, and shuffling at least two additional times and/or permuting the packet-sized portion of the internal state after shuffling the result. As another example, the shuffling may interleaves neighboring vector lanes of a single instruction, multiple data (SIMD) instruction so that at least some highest quality bytes from a first lane of the neighboring lanes and at least some highest quality bytes from a second lane of the neighboring lanes are moved to a location in the first lane.

As another example, the method may also include finalizing the internal state by reducing the size of the internal state by adding four equal-sized portions of the internal state together. As another example, when the plurality of packets include at least one padded packet, wherein the method can include padding the padded packet by determining a quantity of bytes to be padded, selecting one or more bytes from an intermediate buffer, and setting a value of each of the bytes to be padded to the one or more bytes from the intermediate buffer. As another example, the requesting process uses the hash in a bloom filter, as a random number, or as an index to a hash table. As another example, the method may also include determining that the input is not a multiple of 32 bytes, determining a quantity of bytes to be padded, and injecting the quantity with the packet into the internal state.

According to certain aspects of the disclosure, a non-transitory computer-readable medium has code segments stored thereon, the code segments, when executed by a processor cause the processor to perform operations. The operations include, for each of a plurality of packets, each packet including data from an input to be hashed, injecting the packet into an internal state that represents an internal hash sum, mixing the internal state using multiplication, and shuffling the result of the multiplication so that bytes with highest quality are moved to locations that will propagate most widely in a next multiplication operation. The operations also include further mixing the internal state using multiplication after processing the plurality of packets and providing, to a requesting process, a portion of the final internal state as a hash of the input.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
for each of a plurality of packets, each packet including data from an input to be hashed:
injecting the packet into an internal state that represents an internal hash sum,
mixing the internal state using multiplication, and
shuffling a result of the multiplication so that bytes with highest quality are moved to locations that will propagate most widely in a next multiplication operation;
further mixing the internal state using multiplication after processing the plurality of packets; and
providing, to a requesting process, a portion of the further mixed internal state as a hash of the input.

2. The method of claim 1, wherein further mixing the internal state using multiplication includes:
injecting a packet-sized portion of the internal state into the internal state;

mixing the internal state using multiplication; and shuffling the result of the multiplication so that bytes with highest quality are permuted to locations that will propagate most widely in a next multiplication operation.

3. The method of claim 2, wherein further mixing the internal state using multiplication includes repeating the injecting, mixing, and shuffling at least two additional times.

4. The method of claim 2, wherein further mixing the internal state using multiplication also includes permuting the packet-sized portion of the internal state after shuffling the result.

5. The method of claim 1, where the shuffling interleaves neighboring vector lanes of a single instruction, multiple data (SIMD) instruction so that at least some highest quality bytes from a first lane of the neighboring lanes and at least some highest quality bytes from a second lane of the neighboring lanes are moved to a location in the first lane.

6. The method of claim 1, further comprising finalizing the internal state by reducing the size of the internal state by adding four equal-sized portions of the internal state together.

7. The method of claim 1, the method further comprising:
determining that the packet in not a multiple of 32 bytes; and
determining a quantity of bytes to be padded; and
injecting the quantity with the packet into the internal state.

8. A non-transitory computer-readable medium having code segments stored thereon, the code segments, when executed by a processor cause the processor to:
for each of a plurality of packets, each packet including data from an input to be hashed:
injecting the packet into an internal state that represents an internal hash sum,
mixing the internal state using multiplication, and
shuffling a result of the multiplication so that bytes with highest quality are moved to locations that will propagate most widely in a next multiplication operation;
further mixing the internal state using multiplication after processing the plurality of packets; and
providing, to a requesting process, a portion of the further mixed internal state as a hash of the input.

9. A computer system comprising:
at least one processor; and
memory storing instructions that, when executed by the at least one processor, causes the computer system to perform operations including:
reading an input file into an input buffer;
blocking the input buffer into packets;
for each of the packets, updating an internal state using the packet by:
injecting the packet into the internal state,
mixing the internal state using multiplication, and
shuffling a result of the multiplication so that bits with highest quality are permuted to locations that will propagate most widely in a next multiplication operation;
updating the internal state with a packet-sized portion of the internal state by:
injecting the packet-sized portion into the internal state,
mixing the internal state using multiplication, and
shuffling a result of the multiplication so that bytes with highest quality are permuted to locations that will propagate most widely in a next multiplication operation;
finalizing the internal state; and
storing a portion of the finalized internal state as a hash of the input file.

10. The system of claim 9, where the mixing by multiplication is performed on 256 bits in parallel using four Single Instruction Multiple Data (SIMD) vector lanes.

11. The system of claim 10, where the shuffling causes bits with higher quality to be moved to least significant byte positions of a SIMD vector lane and remaining bytes to be moved to most significant bytes positions of the SIMD vector lane.

12. The system of claim 10, where the shuffling interleaves neighboring vector lanes so that at least some highest quality bytes from a first lane of the neighboring lanes and at least some highest quality bytes from a second lane of the neighboring lanes are moved to a location in the first lane.

13. The system of claim 9, wherein an optimization algorithm controls the shuffling.

14. The system of claim 9, where finalizing the internal state includes:
reducing a size of the internal state by four by adding together four equal-sized portions of the internal state.

15. The system of claim 9, wherein the portion stored as the hash is the entire final state.

16. The system of claim 9, wherein the portion stored as the hash is a portion in a lower lane of a 4-lane Single Instruction Multiple Data (SIMD) processor.

17. The system of claim 9, wherein the instructions cause the computer system to perform further operations including:
determining that the input is not a multiple of 32 bytes;
determining a quantity of bytes to be padded; and
injecting the quantity with the packet into the internal state.

18. The system of claim 9, wherein the instructions cause the computer system to perform further operations including:
repeating the updating of the internal state with a packet-sized portion at least two additional times.

19. The system of claim 9, wherein the instructions cause the computer system to perform further operations including, when the input file exceeds a size of the input buffer:
repeating the reading, blocking, and updating of the internal state with each of the packets until reaching an end of the input file,
wherein updating the internal state with the packet-sized portion occurs after reaching the end of the input file.

20. The system of claim 9, wherein when the input is not a multiple of 32 bytes, the instructions cause the computer system to perform further operations including:
determining a value of a byte at a particular position; and
setting a value of each of the bytes to be padded to the value of the byte at the particular position.

* * * * *